United States Patent [19]

Ulrich

[11] Patent Number: 5,789,072
[45] Date of Patent: Aug. 4, 1998

[54] BALE INJECTION DEVICE AND METHOD

[76] Inventor: Donald H. Ulrich, Box 181, Medicine Hat, Alberta, Canada, T1A 7E9

[21] Appl. No.: 822,136

[22] Filed: Mar. 17, 1997

[51] Int. Cl.$^6$ ............................... A23K 1/00; A23K 3/00; A01D 75/00; B30B 15/30
[52] U.S. Cl. ................ 426/281; 426/636; 426/807; 56/341; 56/16.4 R; 56/16.8; 100/45; 100/74; 100/98 A; 99/532; 99/533; 99/534; 99/487
[58] Field of Search ..................... 426/72, 74, 807, 426/281, 321, 635, 623, 654, 442, 323, 630, 636; 56/341, 16.4 R, 16.8; 53/431; 100/45, 74, 98 A; 99/532, 533, 534, 516, 487, 491, 477

[56] References Cited

U.S. PATENT DOCUMENTS

| | | | |
|---|---|---|---|
| 4,185,549 | 1/1980 | Roepnack | 100/45 |
| 4,228,638 | 10/1980 | Rabe | 56/341 |
| 4,327,537 | 5/1982 | Wolrab | 56/1 |
| 4,343,132 | 8/1982 | Lawless | 53/399 |
| 4,453,460 | 6/1984 | Rabe et al. | 100/73 |
| 4,459,798 | 7/1984 | Penfold | 56/341 |
| 4,550,556 | 11/1985 | Meiners | 56/341 |
| 4,606,172 | 8/1986 | Miller | 53/399 |
| 4,627,338 | 12/1986 | Sprott et al. | 99/534 |
| 4,916,888 | 4/1990 | Sheehan | 56/147 |
| 5,010,809 | 4/1991 | Williams | 100/35 |
| 5,022,317 | 6/1991 | Williams | 100/35 |

*Primary Examiner*—Cynthia L. Nessler
*Attorney, Agent, or Firm*—Bennett Jones Verchere

[57] ABSTRACT

A device for and method of injecting a bale of ruminant material with a fluid is taught. The device includes a plurality of injection spikes for insertion into the bale. The spikes are attached to a support for supporting the spikes while they are inserted into the bale. The spikes are attached to the support by a resilient member. The device prevents the deformation of the spikes and thereby increases the useable life of the device over devices in which the spikes are rigidly mounted on a driving structure. The device further has injection drive which allows precise control over the amount of fluid being injected into the bale.

13 Claims, 6 Drawing Sheets

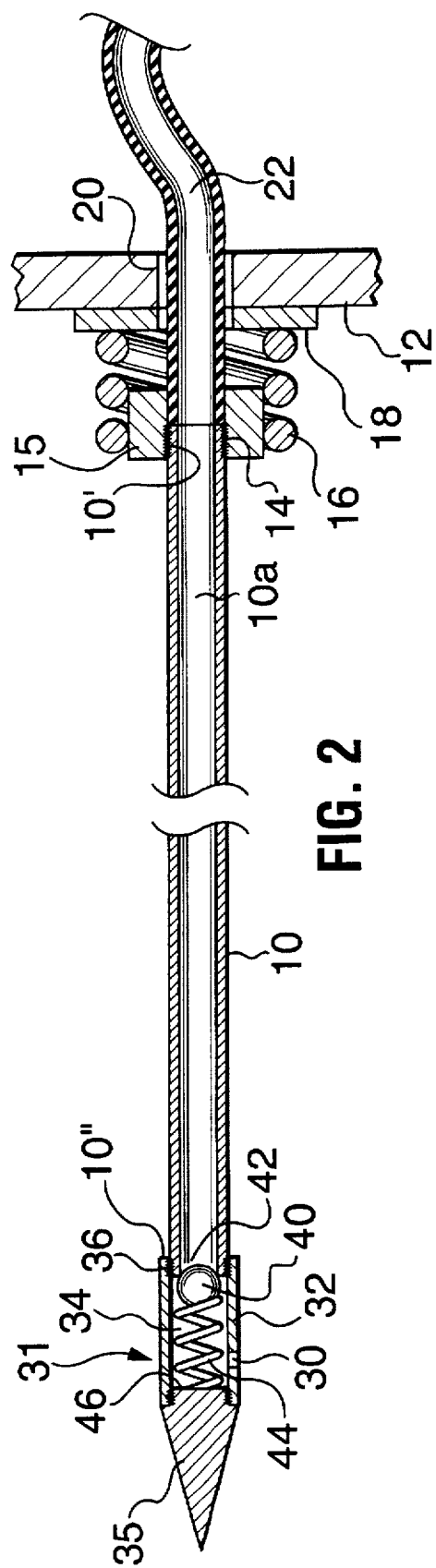

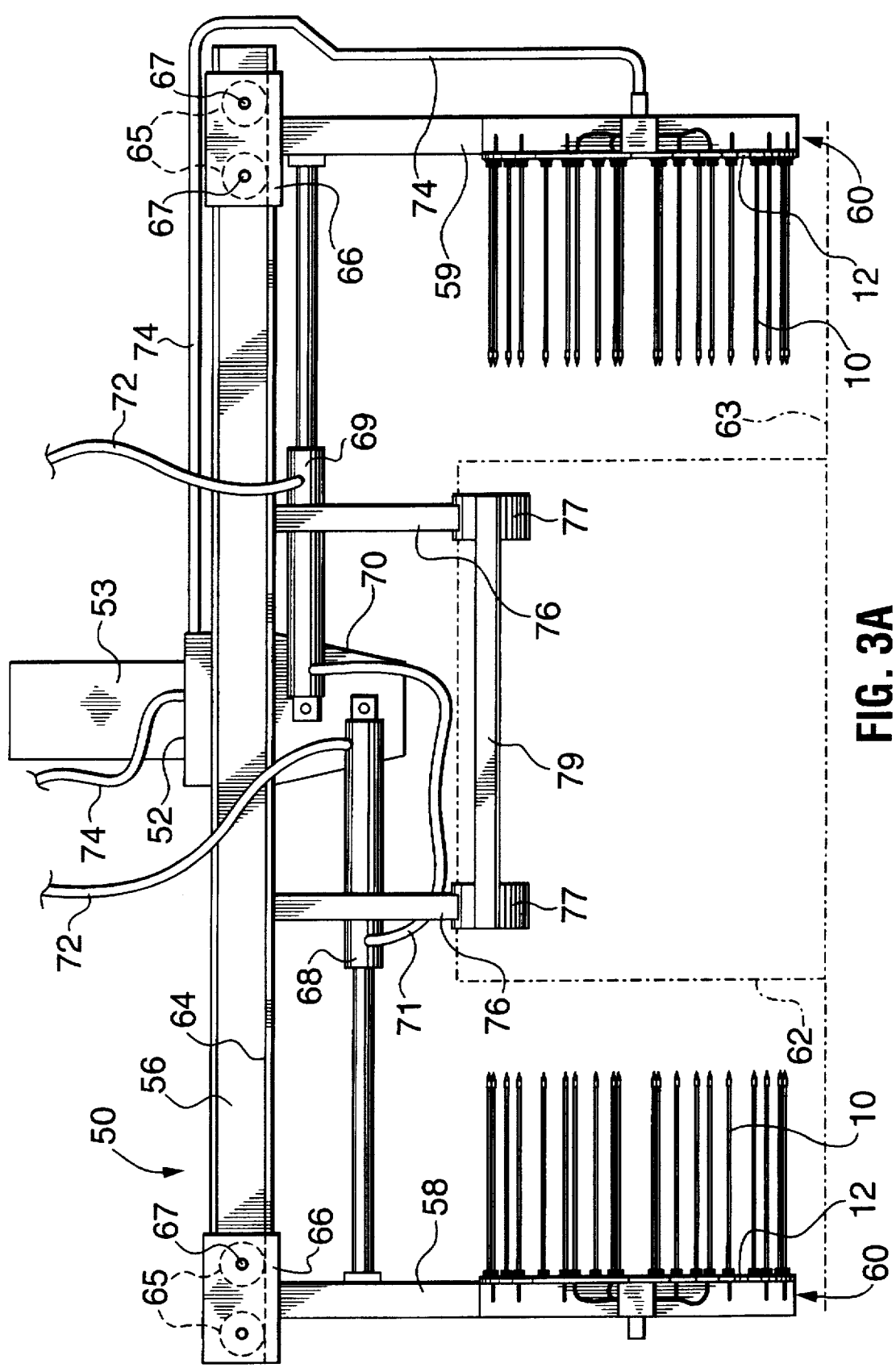

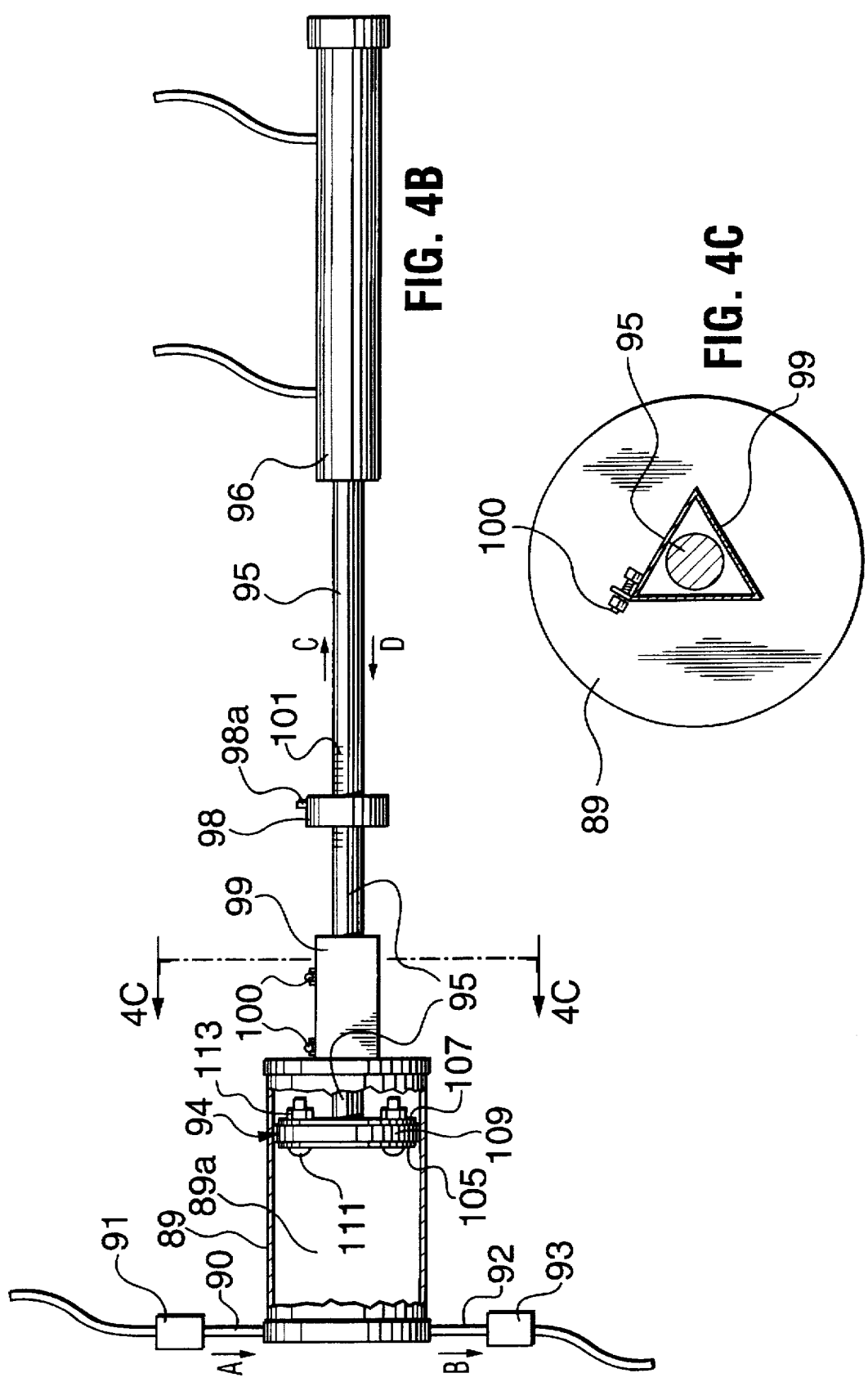

BALE INJECTION DEVICE AND METHOD

FIELD OF THE INVENTION

The present invention is directed toward a device for and method of injecting a fluid into a bale of forage materials.

BACKGROUND OF THE INVENTION

Animals are fed grains, forage feed stuffs for roughage, such as hay and/or straw, and liquid nutrient supplements. A convenient means of administering the liquid nutrient supplements has been to spray or pour the liquid onto the forage feed stuffs before distributing it to the animal feeding areas. This process of spraying or pouring, however, is inconvenient, labour intensive and imprecise. Often nutrients are wasted and more than the required amount is added to compensate for the amounts which are wasted. A method is required for applying liquid nutrients to a feed bale which prevents waste and can be carried out at a convenient time, such as during the bale handling at harvest or just prior to distribution to animals.

Devices for injecting fluid into feed bales are known as described by U.S. Pat. No. 4,606,172 issued August 1986 to Miller. The prior device has a plurality of spikes for driving into the bale to deliver ammonia therethrough into the bale.

An injection device is required which is able to accommodate the forces imparted to the injection spikes during insertion into the bale. An injection device is also required which can be used to control precisely the amount of fluid inserted into the bale.

SUMMARY OF THE INVENTION

A device for injecting a bale with a fluid through a hollow spike or spikes is disclosed which is able to accommodate the forces imparted on the spikes during driving into the bale. A device is also taught which can be adjusted to inject a selected amount of fluid into the bale without continuous monitoring of the volume being injected.

In accordance with a broad aspect of the present invention, there is provided a device for injecting a fluid into a bale comprising: at least one injection spike having passage therethrough; a frame for supporting the spike; a resilient member attached between the spike and the frame and securing the spike to the frame; and a fluid feed system for injecting a fluid from a fluid source through the passage.

In accordance with another aspect of the present invention, there is provided a device for injecting a fluid into a bale comprising: at least one injection spike having a passage therethrough; a frame for supporting the spike; and a fluid feed system for injecting a fluid from a fluid source through the passage including a fluid displacement chamber and means to displace a selected amount of fluid from the system through the passage.

A method for injecting a fluid into a bale is also disclosed. In accordance with a broad aspect of the present invention there is provided a method for injecting a fluid into a bale comprising: providing a device including at least one injection spike having a passage therethrough, a frame for supporting the spike, and a fluid feed system for injecting a fluid from a fluid source through the passage including a fluid displacement chamber and means to displace a selected amount of fluid from the system through the passage.

In a preferred embodiment, the fluid feed system for displacing a selected amount of the fluid from the system includes a fluid displacement means having a housing defining an internal chamber, a one way inlet to the chamber and a one way outlet from the chamber, the chamber containing a piston driven to sweep a selected volume of the chamber to displace a selected volume of fluid from the chamber; selecting the internal volume which is to be swept by the piston; inserting the spike into the bale; and actuating the fluid displacement chamber to displace the selected volume of fluid into the bale.

Thus, in accordance with a further broad aspect of the present invention, there is provided a method for injecting liquid nutrient supplements to a bale comprising: providing a bale; piercing the bale with a hollow spike; and inserting liquid nutrient into the interior of the bale through the hollow spike.

In one embodiment this is accomplished using a device including at least one injection spike having an internal passage therethrough, a frame for supporting the spike and means for injecting liquid nutrients from a liquid source through the internal passage of the spike.

BRIEF DESCRIPTION OF THE INVENTION

The device of the present invention is useful for all types of bales which are prepared in a way that permits insertion of a spike therein. The device includes at least one injection spike having a passage therethrough, a frame for supporting the spike and a fluid feed system for injecting a fluid from a fluid source through the passage of the spike.

In one embodiment of the invention, the spike of the device is sized to be easily inserted into a bale and is preferably slender and elongate having a tapered tip at its outer end.

The spike preferably is sized to extend generally to the centre of the bale and has a diameter such that a hole does not remain in the bale after removal of the spike from the bale. This prevents the formation after removal of the spike of an opening in the bale through which the injected fluid can leak from the bale. The spike is formed of a durable material such as, for example, stainless steel.

The spike is supported by a frame. The frame can take any suitable form. In one embodiment it is a plate member. In another embodiment, the frame is formed as a pair of facing arms which are moveable to approach the bale on opposite sides. The frame can be modified in any desired way to facilitate insertion of the spike into a bale and to support the spike against the forces inherent in such insertion. The frame can also be modified to permit it to be mounted on a farm machine for transport.

In one embodiment of the invention, a device is provided wherein a resilient member is disposed between the spike and the frame. The resilient member acts to secure the spike to extend out from the frame in a selected orientation, but permits the spike to be moved out of that selected orientation by application of a selected minimum force to the spike. By action of the resilient member, the spike will return to substantially its selected orientation when selected minimum the force is removed. The resilient member reduces deformation and shearing of the spike and, therefore, extends the useable life of the spike and the device. The resilient member can be any suitable member such as a spring or an elastomeric material.

The device further includes a fluid feed system for injecting a fluid from a fluid source through the passage of the spike. The system can be any suitable system for injection of fluids and can include for, example pumps, valves, fluid conduit and seals.

In one embodiment, the fluid feed system includes a fluid displacement means. The fluid displacement means includes a chamber having an internal piston driven by a ram. A stop on the ram determines the internal chamber volume which is swept by the piston and therefore, the amount of fluid which is displaced from the chamber by the piston during the stroke of the piston. Preferably, the stop can be adjustable along the ram to select the chamber volume which is swept by the piston.

The device of the present invention can be used to inject a fluid into a bale. In a preferred method, liquid nutrient supplements are injected into a feed bale. Liquid nutrient supplements are known and contain various formulations of proteins, vitamins, minerals and carbohydrates. Preferably, the liquid nutrients are injected into straw bales according to the method of the present invention. This causes the straw, which is normally not readily consumed by cattle, to be more palatable to the cattle and to have greater nutritional content. In one embodiment, the method provides that a selected volume of nutrients is injected to the bale and fed to the animals with the bale. This can be done after formation of the bale before storing the bale or, preferably, just prior to feeding the bale to the animals. Injection of the nutrient just prior to feeding avoids breakdown of the nutrients and permits adjustment of the amount injected depending on feed requirements at the time.

BRIEF DESCRIPTION OF THE DRAWINGS

A further, detailed, description of the invention, briefly described above, will follow by reference to the following drawings of specific embodiments of the invention, which depict only typical embodiments of the invention and are therefore not to be considered limiting of its scope. In the drawings:

FIG. 2 is a sectional view of an injection spike useful in the present invention;

FIG. 3A is a front elevation view of another embodiment of an injection device according to the present invention;

FIG. 4B is a front elevational view of a fluid displacement chamber useful in the present invention with the housing shown cut away; and FIG. 4C is a sectional view through line 4C—4C of FIG. 4B.

DETAILED DESCRIPTION OF THE PREFERRED EMBODIMENTS

Figure 1:
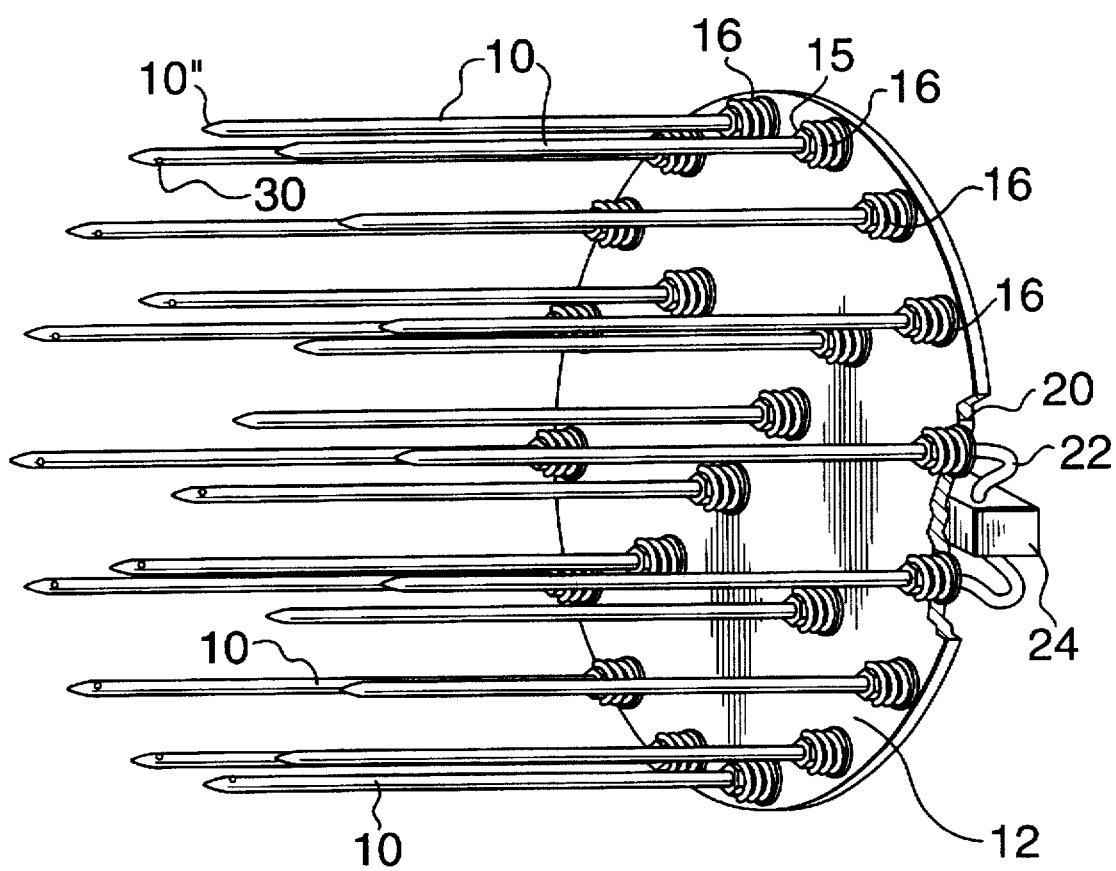
FIG. 1 is a perspective view of an injection device according to the present invention with the frame partially cut away.

Referring to FIGS. 1 and 2, a device according to the present invention is shown having a plurality of spikes 10 supported by a frame formed as a plate 12. The device shown in FIG. 1 is intended for use to inject fluids into a circular bale, thus the spikes 10 are spaced on plate 12 so as to penetrate the central area of such a bale. In particular, a circular bale generally has a diameter of between about 4 to 6 feet. Thus, spikes 10 are spaced about an area having a diameter of about 47 inches. Preferably, the plate is circular in plan view having a diameter of 48 inches. The plate is preferably formed of steel.

Each spike is preferably slender and elongate to facilitate insertion into a bale. Preferably also, the spikes are tapered at their outer ends 10". The spikes are selected such that their ends 10" extend a suitable distance into the bale. For example, in a preferred embodiment for use with a circular bale having a length of about 4 to 5 feet, the probes are selected to be about 22 inches in length. Preferably, the spikes are selected such that when they are removed from a bale, a wound will not be left in the bale. For example, in a preferred embodiment the spike has a diameter of less than about 1 inch and preferably has a ½ inch outer diameter. Preferably, the spikes are formed of a strong durable material, such as for example stainless steel tubing.

Each spike 10 is threaded at its inner end 10' and is engaged in a threaded bore 14 of a coupler 15. Coupler 15 is retained, such as by welding, in a coil spring 16 which is secured to plate 12, such as by welding. Spring 16 normally maintains spike 10 in a position substantially perpendicular to plate 12. Application of a force which is sufficient to overcome the tension in spring 16 will move spike 10 out of the perpendicular position and also provides that the spike will return to the substantially perpendicular position, when the force is removed. The spring can be replaced by any resilient member which provides for such movement. Preferably, the spring is selected to permit the spike to be moved out of its substantially perpendicular position by application of a force of between 20 and 80 pounds of pressure (psig) perpendicular to the long axis of the spike at its tip and preferably 50 pounds of pressure. Preferably, the spring is a heavy gauge coil spring welded to a washer 18 which is in turn welded to plate 12. When the plate 12 and spike 10 are of the dimensions stated above as being preferred, the coil spring is preferably a 2 inch OD, 1 ¾ inch ID and 2 ½–3 inch long steel coil spring having a tensile strength of 200,000 psi.

Each spike 10 has a passage 10a therethrough. Passage 10a extends axially through spike 10 and is in communication at its inlet end with bore 14 of threaded coupler 15. The outlet end of each passage 10a communicates with at least one exit port 30 in the spike adjacent its outer end. A fluid-tight seal is provided at each point of connection such as for example by hydraulic line coupling means or o-rings (not shown).

Plate 12 has apertures 20 formed therethrough for passage of fluid lines 22 which extend between bore 14 of coupler 15 and a fluid distribution chamber 24 (FIG. 4a), mounted on the rear side of plate 12. Fluid lines 22 provide a fluid-tight conduit from chamber 24 to coupler 15. Connections are sealed by any suitable means against passage of fluids.

A fluid feed circuit is set up whereby a fluid source such as a supply tank (80 in FIG. 4A) is in fluid communication with exit ports 30 of the spikes 10 by conduit means including distribution chamber 24, feed lines 22, bore 14 and spike passage 10a. A suitable regulator is provided for regulating the flow of fluid from the fluid source through the conduits and passaging for injection into a bale impaled on spikes 10.

In a preferred embodiment as shown in FIG. 2, a ball valve 31 is mounted at the outer end of each spike between passage 10a and exit port 30 to regulate the flow of fluid from the spikes. Valve 31 comprises a housing 32 having an inner chamber 34, with at least one exit port 30 extending through the housing in communication with the inner chamber. Preferably, housing 32 has a tapered tip 35 to facilitate insertion into a bale. Preferably, tip 35 is threadably engaged to housing 32 so that tip 35 can be replaced without replacing the entire housing. Valve 31 is preferably secured to spike 10 by threading at 36 which facilitates repair or replacement. A ball 40 is seated against the outlet opening 42 of passage 10a and is maintained in position by a spring 44 acting between an end wall 46 of inner chamber 34 and ball 40. Ball 40 will normally provide a fluid-tight seal against opening 42 unless fluid flows at a pressure sufficient to overcome the tension in spring 44 to move ball 40 away from opening 42. The tension in spring 44 can be adjusted by tightening tip 35 onto housing 32. Preferably, the valve is selected to be opened by fluid at 30 pounds pressure.

Figure 3B:
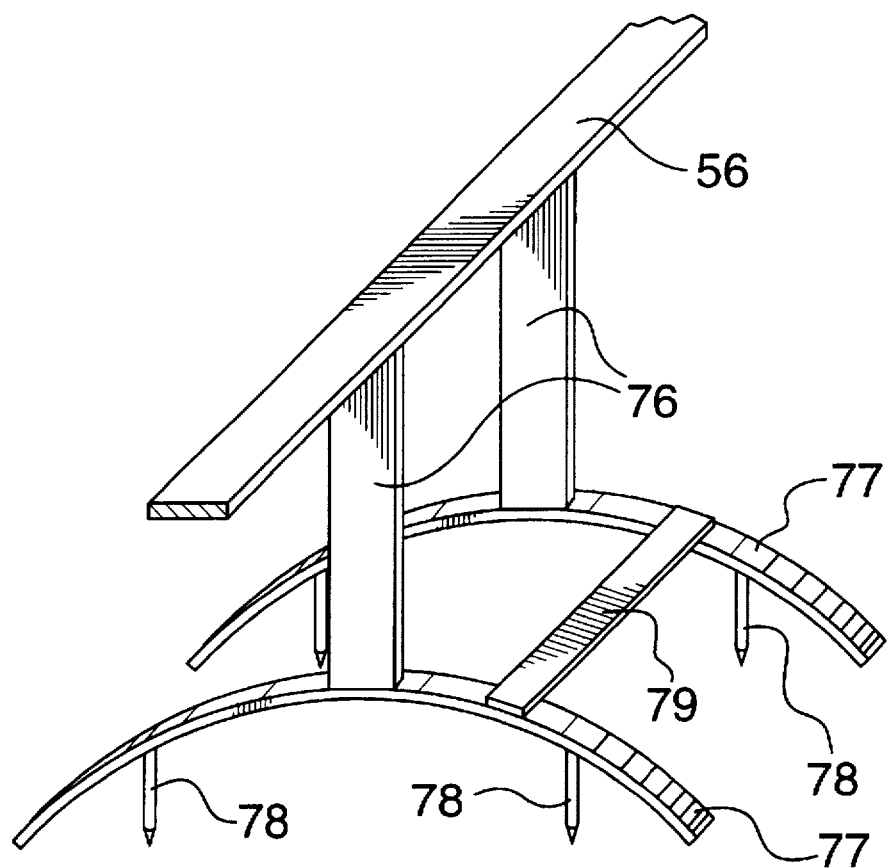
FIG. 3B is a perspective view of a bale stabilizer attachment useful in the embodiment of FIG. 3A shown attached to a frame bar.

Another embodiment of the device is shown in FIGS. 3A and 3B. The device has a frame 50 having mounted thereon a mounting attachment 52 for connection to a cherry picker implement arm 53. Mounting attachments for cherry pickers are known and will not be described herein. Any other mounting attachment can be used for transport of the device by another farm implement. In the preferred embodiment, however, the frame is attached to an implement which provides for vertical movement of the device.

Frame 50 includes a top bar 56 carrying a pair of spaced, downwardly extending arms 58, 59 at the outer ends of which spiked plates 60 are mounted. FIG. 3A shows the arms in open position aligned for movement towards each other and insertion into bale 62 positioned on a ground surface 63.

Spiked plates 60 each include plate 12 and spikes 10 and are preferably as described in relation to plate 12 of FIG. 1 and having spikes and spike mounting arrangements as described in relation to FIG. 2.

Top bar 56 has formed thereon or attached thereto roller tracks 64 to accept and retain roller wheels 65 (shown in phantom) secured onto arms 58, 59 by brackets 66 and pins 67. Roller wheels 65 are free to ride along tracks 64 and thereby move arms 58, 59 along bar 56. To drive the movement of the arms along the bar, hydraulic cylinders 68, 69 extend between arms 58, 59, respectively and a central mounting flange 70 on bar 56. Preferably, cylinders 68, 69 are calibrated, as is known, to drive arms 58, 59 at the same rate and cylinders 68, 69 are connected by a line 71 extending between them. Cylinders 68, 69 are further connected by lines 72 to a hydraulic fluid source and a standard control mechanism. The action of the cylinders is controlled by an operator through the control mechanism. Instead of the roller track and hydraulics arrangement as shown, the movement of the arms relative to each other can be driven by any other suitable drive means.

Fluid feed lines 74 lead from a fluid source (not shown) to spiked plates 60. Lines are formed preferably of hydraulic hose, rubber hose and/or tubing.

A bale stabilizing means depends downwardly from bar 56 intermediate arms 58, 59. The means includes a pair of arms 76 each having positioned at its lower end a stop plate 77 for abutting against a bale to be injected. Bale stabilizing spikes 78 (FIG. 3B) extend from stop plates 77. A bar 79 extends between the stop plates to strengthen the arrangement. It is to be understood that any number of arms will work. For example, the pair of arms shown can be replaced by one which is located substantially centrally.

The length of arm 76 is preferably selected relative to the distance of the spiked plate 60 from bar 56 such that when stop plate 78 rests on the bale, the spikes are positioned for entry into the bale. Preferably, the length of the arm 76 is selected such that spikes 10 are positioned centrally relative to the bale, in preparation for insertion into the bale.

Figure 4A:
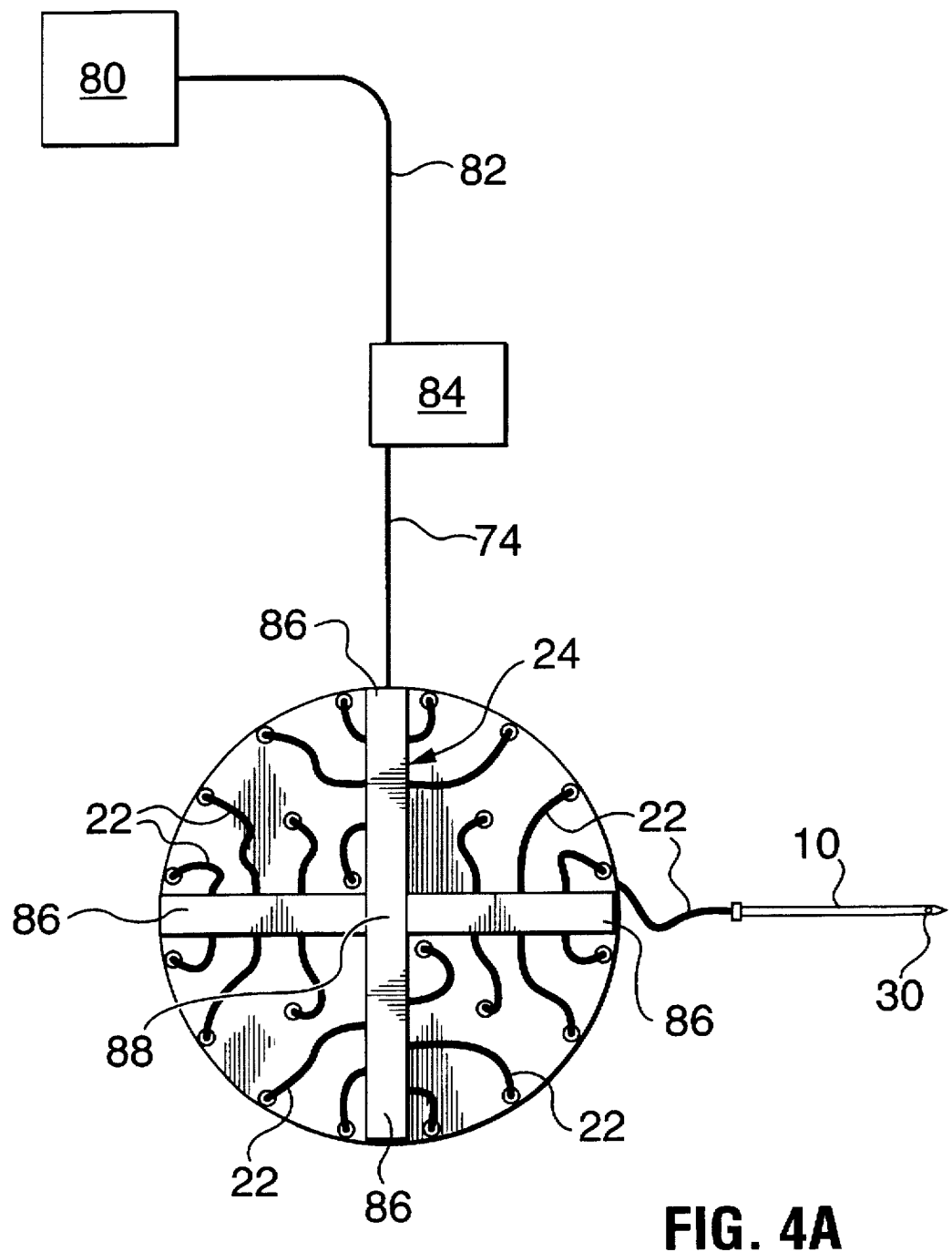
FIG. 4A is a schematic view of a fluid flow system useful in the present invention.

Referring to FIGS. 4A, 4B and 4C, a fluid feed system useful in the present invention comprises a fluid source 80, a line 82 leading from source 80 to a fluid displacement means 84, line 74 leading from means 84 to fluid distribution chamber 24 and lines 22 leading to the passages of spikes 10. The fluid feed system is formed to be substantially fluid-tight preferably to contain internal fluid pressures of between about 25 to 80 pounds pressure. The fluid source can be, for example, a tank carried on a farm implement. Lines 82, 74, 22 can be formed from any suitable fluid-tight materials such as hydraulic lines or tubing. All connections are fluid-tight. Fluid distribution chamber 24 can be formed in any suitable way for distribution of fluids under pressure to lines 22. Preferably, chamber 24 is mounted on plate 12 and is formed by four 4"×4" tubes 86 extending from a central hub 88.

Fluid displacement means 84 includes a housing 89 which defines a cylindrical chamber 89a. Preferably, housing 89 is formed from hydraulic cylinder tubing having a polished inner surface. The cylindrical chamber 89a is selected to have a volume corresponding to the range of volumes which is desired to be injected using the device. Leading into the chamber, according to the direction of fluid flow, is an inlet line 90 with a one-way check valve 91. Valve 91 is selected to permit fluid flow in a direction, indicated by arrow A, into chamber 89a and to block flow in an opposite direction. Leading away from the chamber is outlet line 92 with a second one-way check valve 93. The second valve 93 is selected to permit fluid flow in a direction, indicated by arrow B, out of chamber 89a and to block flow in an opposite direction. A piston 94 is contained in chamber 89a and is connected to a ram 95. Ram 95 is driven by a hydraulic cylinder 96. When ram 95 is driven by cylinder 96, piston 94 is moved within chamber 89a. Piston 94 is selected to form a fluid tight seal against the inner cylindrical surface of the housing.

In one embodiment in which liquid is injected, the piston has a first plate 105, a second plate 107 and sandwiched therebetween a rubber sheet 109. Plates 105 and 107 have a slightly smaller diameter than the chamber diameter. Rubber sheet 109 has slightly larger diameter than the diameter of the chamber and a thickness of about ½ inch. Ram 95 is attached to plate 107. Bolts 111 are welded onto plate 105 and extend through apertures in rubber sheet 109 and plate 107 where nuts 113 are threadably engaged onto bolts 111. To adjust the seal of the piston against the inner surface of the chamber, nuts 113 can be tightened on bolts 111 to force plates 105 and 107 closer together and to urge rubber sheet 109 to be expanded outwardly.

When the system, and thereby the displacement means, is fully charged with fluid, any movement of piston 94 within chamber 89a, will cause a flow of fluid through the system. In particular, when the ram and, thereby, the piston are driven by cylinder 96 in the direction indicated by arrow c, fluid will be drawn from fluid source 80 through check valve 91 into chamber 89a and when the ram and the piston are driven by the cylinder in the direction indicated by arrow d, fluid will be forced from the chamber through valve 93 out through the exit ports 30 in spikes 10.

The volume of chamber 89a which is swept by piston 94 is selected to correspond with the volume of fluid which is to be injected into the bale. To select the volume of the chamber which is swept by the piston from the position in which the ram is most withdrawn from the chamber, preferably, a stop 98 is securely positioned by a lock pin 98a on ram 95 to limit the extent to which the ram can be driven along chamber 89a. The stop can abut against housing 89 or, alternately, as shown, the stop can abut against a collar 99 secured about the ram by screws 100 between the stop and the housing. The collar is selected to have a shape or minimum internal diameter to prevent the stop from passing beneath it. To select the volume which is swept by the piston, the collar can be replaced with a collar having a different length. Preferably, a set of collars are provided having different lengths and are marked to indicated which volume of fluid will be displaced using any selected collar. Alternately or in addition, to select the volume which is swept by a piston stroke, the stop can be locked using pin 98a into a selected position along the ram. Preferably, the ram is marked with calibrations 101 to indicate the volume at any stop location along the ram.

In use, the device is positioned relative to a bale such that the spikes are aligned for insertion into the bale. The spikes are then driven into the bale and fluid is injected therethrough. Using the device of FIG. 3A, spikes 10 can be driven quickly into the bale, for example over a period of about 5 to 10 seconds until plate 12 abuts against the bale. The displacement means, as shown in FIG. 4B can be actuated during the entire 5 to 10 seconds to inject fluid through the thickness of the bale. The spikes are then removed from the bale. Any volume of fluid can be injected by adjusting the stop or collar on the ram. In one embodiment, a displacement means having a chamber volume of 8½ gallons is used and the ram stop is adjusted to deliver 5 gallons of liquid into a bale over a delivery of 8 seconds.

It will be apparent that many changes may be made to the illustrative embodiments, while falling within the scope of the invention and it is intended that all such changes be covered by the claims appended hereto.

The embodiments of the invention in which an exclusive property or privilege is claimed are defined as follows:

1. A method for injecting a fluid into a bale comprising:
   providing a device including at least one injection spike having a passage therethrough, a frame for supporting the spike, a coil spring attached between and securing the spike to the frame, and a fluid feed system for injecting a fluid into the bale from a fluid source through the passage of the spike including a fluid displacement chamber and means to displace a selected amount of fluid from the system through the passage;
   selecting the internal volume which is to be swept by the piston;
   inserting the spike into the bale; and
   actuating the fluid displacement chamber to displace the selected volume of fluid into the bale.

2. The method of claim 1 wherein the fluid displacement means comprises a housing defining an internal chamber, a one way inlet to the chamber and a one way outlet from the chamber, the chamber containing a piston driven to sweep a selected volume of the chamber to displace a selected volume of fluid from the chamber.

3. The method of claim 2 wherein the piston is driven within the chamber by a ram which provided with a stop to limit the length of the piston stroke within the chamber and the step of selected the internal volume which is to be swept by the piston includes adjusting the stop along the ram.

4. The method of claim 2 wherein the piston is driven within the chamber by a ram which provided with a stop to limit the length of the piston stroke within the chamber and the step of selecting the internal volume which is to be swept by the piston includes fitting a collar about the ram between the stop and the housing, the collar having a shape which prevents the ram from passing the collar.

5. The method of claim 1 wherein the fluid comprises liquid nutrient supplements.

6. The method of claim 5 wherein the liquid nutrient supplements are injected after formation of the bale.

7. A device for injecting a fluid into a bale comprising:
   a bale stabilizing means for stabilizing the bale;
   at least one injection spike having a passage therethrough;
   a frame for supporting the spike;
   a soil spring attached between and securing the spike to the frame;
   and a fluid feed system for injecting a fluid from a fluid source through the passage of the spike.

8. The device of claim 7 wherein the frame includes a bar, a pair of arms supported by and moveable toward and away from each other, each arm having supported thereon at least one injection spike.

9. The device of claim 8 wherein the frame further includes the bale stabilizing means for stabilizing the bale, the bale stabilizing means also defining means for positioning the at least one spike for injection.

10. A device for injecting a fluid into a bale comprising:
    a bale stabilizing means for stabilizing the bale;
    at least one injection spike having a passage therethrough;
    a frame for supporting the spike;
    a coil spring attached between and securing the spike to the frame; and
    a fluid feed system for injecting a fluid from a fluid source through the passage of the spike including a fluid displacement chamber and means to displace a selected amount of fluid from the system through the passage.

11. The device of claim 10 wherein the piston is driven within the chamber by a ram which is provided with a stop to limit the length of the piston stroke within the chamber.

12. The device of claim 10 wherein the fluid displacement means comprises a housing defining an internal chamber, a one way inlet and a one way outlet, the chamber containing a piston driven to sweep a selected volume of the chamber to displace a selected volume of fluid from the chamber.

13. The device of claim 12 wherein the piston is driven within the chamber by a ram which provided with a stop to limit the length of the piston stroke within the chamber.

* * * * *